(12) United States Patent
Montalvo

(10) Patent No.: US 7,198,279 B2
(45) Date of Patent: Apr. 3, 2007

(54) GUIDE WHEEL ASSEMBLY FOR CARTS

(76) Inventor: Samuel A. Montalvo, 11895 Overland Rd., Reno, NV (US) 89506

( * ) Notice: Subject to any disclaimer, the term of this patent is extended or adjusted under 35 U.S.C. 154(b) by 10 days.

(21) Appl. No.: 10/940,346

(22) Filed: Sep. 13, 2004

(65) Prior Publication Data

US 2006/0055133 A1    Mar. 16, 2006

(51) Int. Cl.
*B62D 39/00* (2006.01)
(52) U.S. Cl. .............................. 280/33.992; 280/DIG. 4
(58) Field of Classification Search ........... 280/33.991, 280/33.992, 33.994, DIG. 3, DIG. 4
See application file for complete search history.

(56) References Cited

U.S. PATENT DOCUMENTS

| 2,935,331 | A | | 5/1960 | Ledgerwood | 280/79.3 |
|---|---|---|---|---|---|
| 3,405,783 | A | * | 10/1968 | Clark et al. | 188/5 |
| 3,475,036 | A | * | 10/1969 | Smith | 280/33.994 |
| 3,772,994 | A | * | 11/1973 | Juarbe | 104/140 |
| 4,580,800 | A | * | 4/1986 | Upton et al. | 280/33.994 |
| 4,826,186 | A | | 5/1989 | Hagelin | 280/33.994 |
| 5,033,757 | A | * | 7/1991 | Lloyd | 280/33.992 |
| 6,271,755 | B1 | * | 8/2001 | Prather et al. | 340/568.5 |
| 6,331,009 | B1 | | 12/2001 | Wilkinson | 280/33.996 |

* cited by examiner

*Primary Examiner*—Christopher P. Ellis
*Assistant Examiner*—Brian Swenson
(74) *Attorney, Agent, or Firm*—Law Offices of Terry McHugh

(57) ABSTRACT

A guide wheel assembly adapted to retrofit a shopping cart having a guide wheel capable of only rotating in the intended direction of travel of the shopping cart and a flexible one piece mechanism possessing strong material memory such that constant contact between the guide wheel and a traveling surface is maintained. The guide wheel assembly is configured to allow the nesting of multiple carts.

3 Claims, 3 Drawing Sheets

GUIDE WHEEL ASSEMBLY FOR CARTS

TECHNICAL FIELD

This invention relates generally to hand pushed carts fitted with casters and more particularly the maneuverability and control of those carts.

BACKGROUND ART

There is a wide variety of hand pushed carts in use for various purposes. One type of hand pushed cart in general use is the shopping cart employed in retail and wholesale commercial stores. This type of cart has a frame, when viewed from above, in the shape of a trapezoid. The narrow end of the trapezoid defines the front of the frame and the wide end of the trapezoid defines the rear of the frame. Attached to the top of the frame is a carrier for transporting items. Attached to the bottom of the frame are two pairs of wheels. The front pair are casters that provide a turning capability to the cart. The rear pair of wheels is fixed in direction, so as to only allow roll in the intended direction of travel. The wheels are located on the frame as near the corners as practical.

One advantage of this type of cart is that it has the ability to fit one inside the other for compact storage. This requires the rear of the frame to be free of obstruction to allow one cart to be inserted into another identical to it. On the other hand, a number of disadvantages exist with a shopping cart having a conventional design. One disadvantage is the wide turning radius required to turn a corner or to turn around. Another disadvantage is the lack of maneuverability when trying to negotiate a narrow aisle passage or tight space along a display case, often requiring the operator of the cart to lift the rear wheels and slide the cart into a desired position. Both disadvantages are made worse when the shopping cart comes under load. The force and difficulty required to maneuver the cart increases as the load increases, becoming a concern for the elderly, infirmed or person of slight build. Another disadvantage of current shopping cart design is the tendency for the cart to pivot about its rear wheels and roll down an incline perpendicular to an initial longitudinal axis of the cart.

There have been a number of attempts to overcome the problems associated with maneuvering shopping carts. U.S. Pat. No. 6,331,009B1 to Wilkinson describes a shopping trolley with four casters located at the corners of a frame, with a control wheel assembly located near the load center of the trolley. The control wheel assembly includes a fixed wheel capable of only rotating about its hub and a damping means to maintain the fixed wheel in constant contact with a traveling surface. Also provided is a lifting lug to raise the control wheel from the traveling surface and allow the nesting of carts of identical design.

U.S. Pat. No. 4,826,186 to Hagelin describes a hand pushed cart having an "M" shaped bottom frame, when viewed from above. Attached to the frame are four casters, each located at a corner of the frame. A fifth wheel (or pair of wheels), capable of only rotating about the hub axis, is located at or near the load center of the frame. The casters and the fifth wheel do not reside along the same plane, i.e. the front and rear wheels do not touch a traveling surface at the same time. The fifth wheel does not have a damping or spring bias.

The prior art addresses many of the disadvantages present in conventional shopping carts. However, in doing so the complexity of the design has significantly increased. As design complexity increases, so do the maintenance and the replacement cost for each cart.

SUMMARY OF THE INVENTION

In one embodiment of the invention, four casters are attached to a frame of a cart in a non-rocking configuration. Also attached to the frame is a guide wheel assembly for the purpose of biasing the cart in a desired direction, which may be other than a direction provided by the casters. The guide wheel assembly includes a guide wheel, capable of rotating only about its hub axis, located within the area having its four corners defined by the casters. The guide wheel is attached to an end of a one piece mechanism. The one piece mechanism may be formed of spring steel or similar flexible material having a strong material memory. The opposite end of the mechanism is attached to the front end of the frame of the cart. The spring steel mechanism maintains the guide wheel in constant contact with a surface, even one having a varying topography. However, the upward pressure applied by the spring steel mechanism should be less than the empty weight of the shopping cart, so as not to raise any casters away from the traveling surface.

In the preferred embodiment of the invention, the four casters are attached near the corners of the frame of a shopping cart. A guide wheel assembly is attached to the front end of the shopping cart frame that is transverse to the longitudinal axis of the shopping cart. The guide wheel assembly consists of a guide wheel and a one piece spring steel mechanism. The guide wheel is only able to rotate about its hub axis and is located at or near the load center of the shopping cart. The guide wheel is attached to an end of the spring steel mechanism. The spring steel mechanism maintains the guide wheel in constant contact with a traveling surface of varying topography.

An alternate embodiment of the invention provides for a shopping cart having a direction of travel along its longitudinal axis and outfitted with an array of casters, at least one caster having a spring mechanism to maintain the caster in constant contact with a traveling surface. Also provided is a guide wheel assembly which includes a guide wheel located at or near the load center of the cart and attached to an end of a one piece spring steel mechanism that maintains constant contact between the guide wheel and a traveling surface. The opposite end of the one piece spring steel mechanism is attached to the front end of the shopping cart that is transverse to the longitudinal axis of the cart.

Another alternative embodiment of the invention provides for a shopping cart having a direction of travel along its longitudinal axis and outfitted with an array of casters, at least one caster having a spring mechanism to maintain the caster in constant contact with a traveling surface. Also provided is a guide wheel assembly which includes a guide wheel located at or near the load center of the cart and attached to a one piece spring steel mechanism that maintains constant contact between the guide wheel and a traveling surface. The opposite end of the one piece spring steel mechanism is connected to the front end of the shopping cart that is transverse to the longitudinal direction of travel. The guide wheel assembly is connected in a manner that allows multiple shopping carts to be nested together. The attachment of the guide wheel to the one piece mechanism is configured in a manner that does not impede travel over a curb.

DETAILED DESCRIPTION

Figure 1:
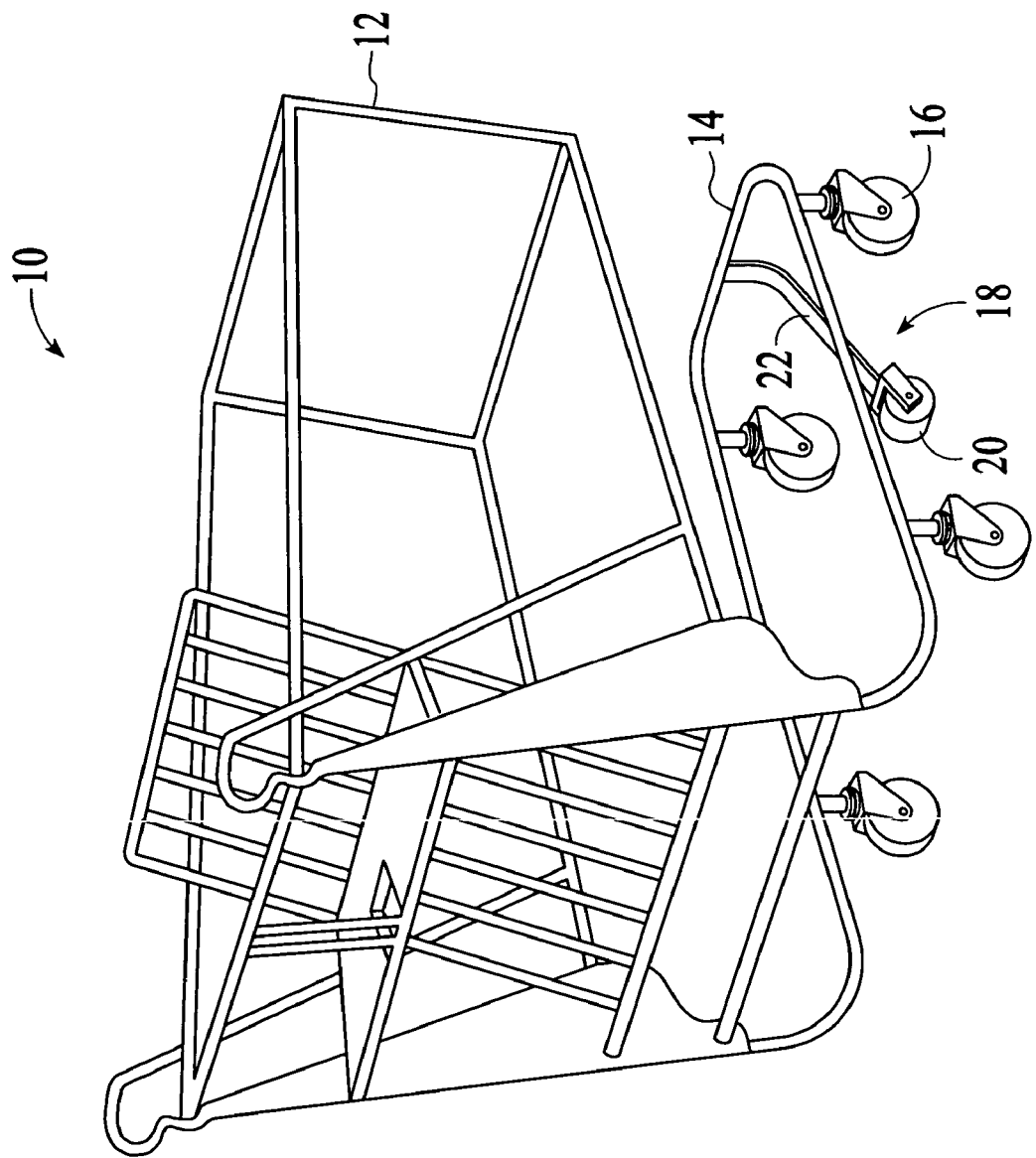
FIG. 1 is a perspective view of a shopping cart showing the preferred embodiment of the invention.

FIG. 1 is a perspective view of a shopping cart 10 having a frame 14 that is essentially in the shape of an "L". Attached to the upright portion of the frame, and extending over the horizontal portion of the frame, is a carrier 12. Attached to the bottom side of the horizontal portion of the frame, by means known to those of ordinary skill in the art, are four swiveling wheels, or casters 16. Attached to the front of the frame 14 and centrally located between the casters attached to the front of the frame is a guide wheel assembly 18. The guide wheel assembly is comprised of a guide wheel 20 and a spring steel mechanism 22. Guide wheel 20 is attached to one end of the spring steel mechanism by a means known in the art and is capable of rotating only about its hub axis. The opposite end of the spring steel mechanism is attached to the front of the frame by a known means and is located centrally between the casters 16 attached to the front of the frame. The spring steel mechanism is configured in a manner that allows the guide wheel to make constant contact with a traveling surface at or near the load center of the frame 14.

Figure 2:
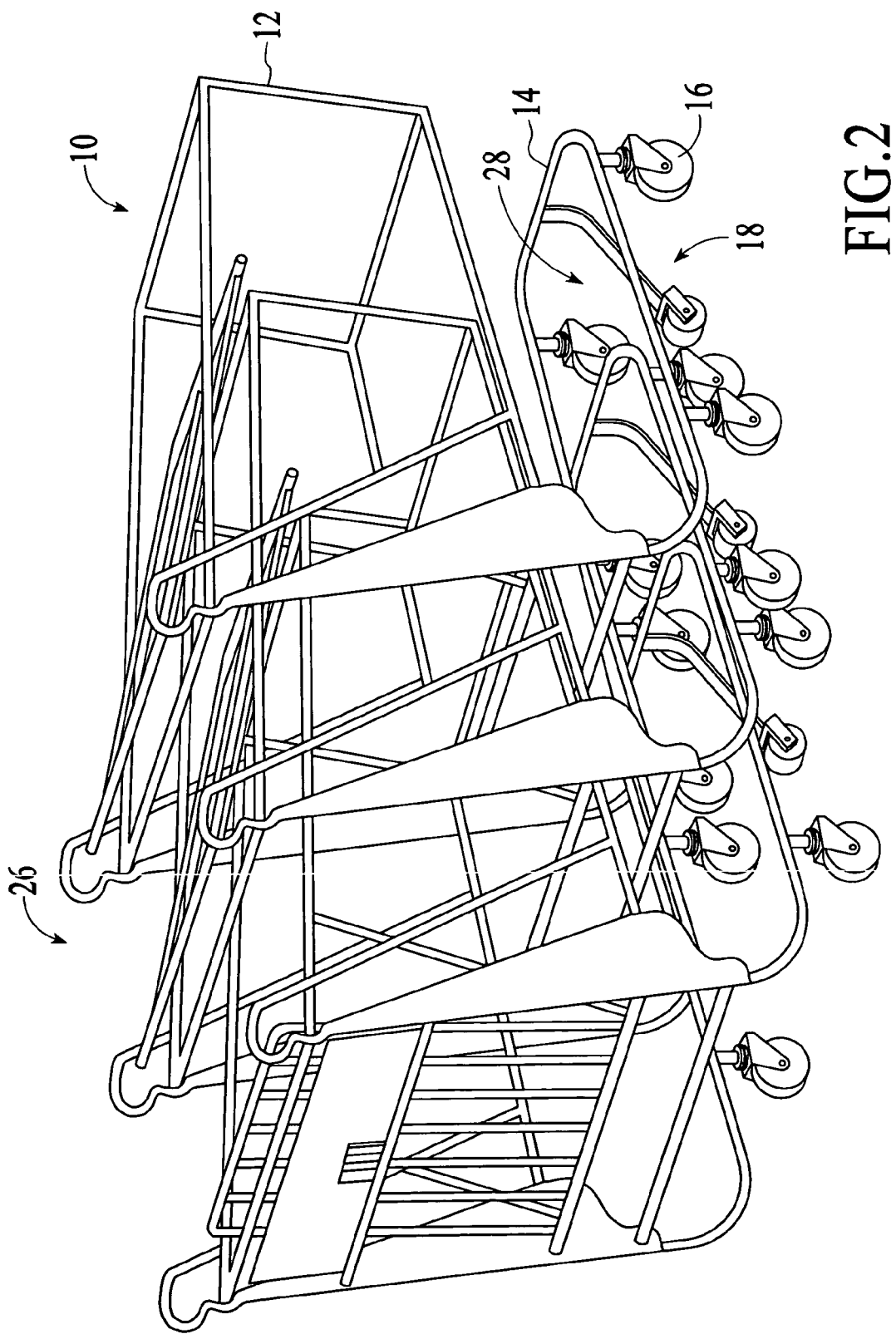
FIG. 2 is a view of multiple shopping carts in a nested configuration.

Referring to FIG. 2, shopping carts 24 and 26 are shown nested together in a manner typically required for compact storage. Each shopping cart is comprised of an "L" shaped frame 14, a carrier 12 and a guide wheel assembly 18. In the configuration shown, the carrier of the cart 26 fits inside the carrier of the cart 24. In a like manner, the frame 14 of the cart 26 fits inside the frame of the cart 24. The guide wheel assemblies 18 and the frames of shopping carts 24 and 26 define a nesting area 28 that enables the guide wheel assembly 18 of a shopping cart 26 to be inserted into the nesting area 28 of the cart 24. In FIG. 2, shopping carts 24 and 26 are of a design in which the frames 14 and guide wheel assemblies 18 easily fit one into the other with minimal or preferably zero interference.

Figure 3:
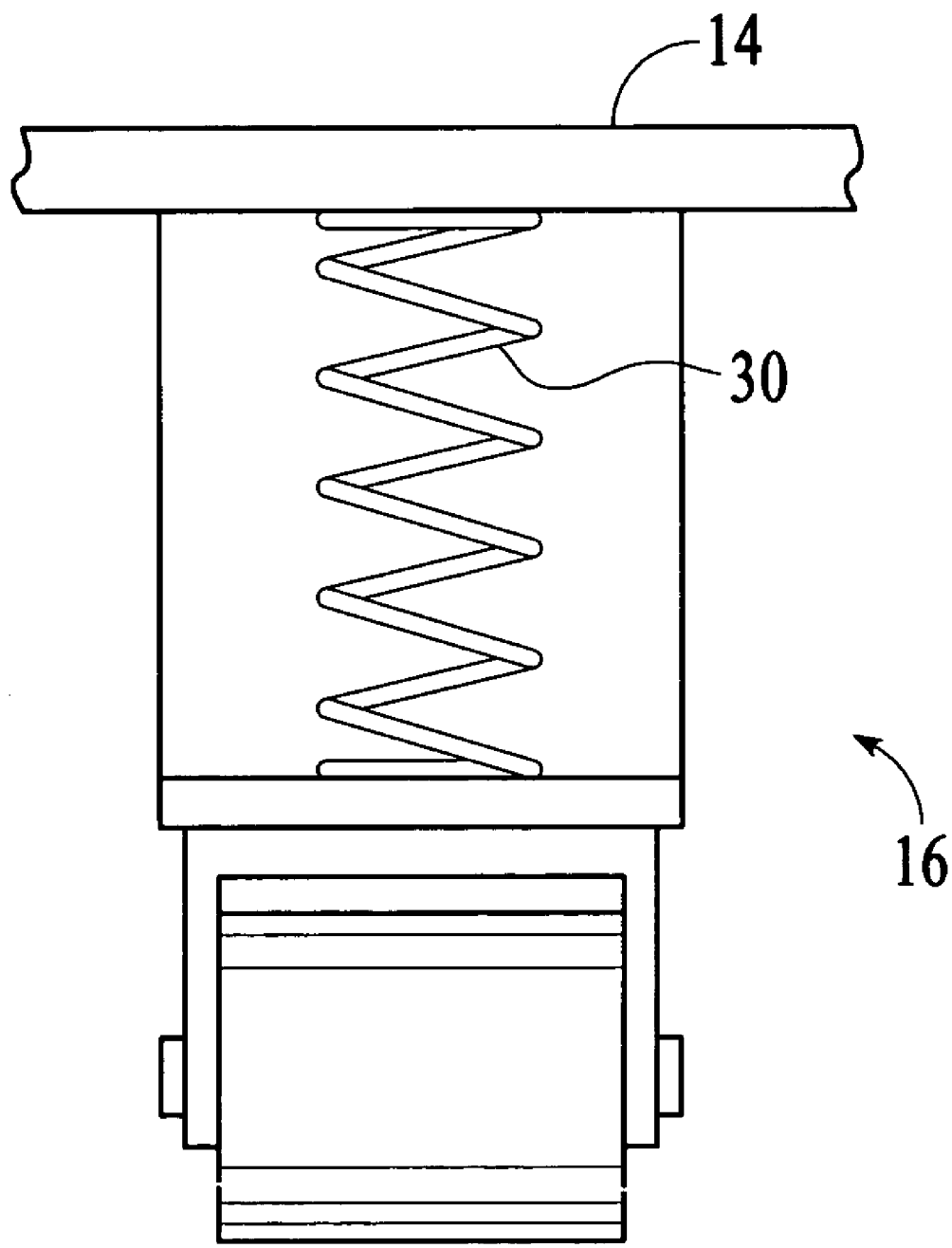
FIG. 3 is a detailed view of a caster with a spring mechanism.

Referring to FIG. 3, there is shown a detailed view of a caster 16 in accordance with a preferred embodiment of the invention. The caster 16 is attached to a frame 14 by a known means. A spring mechanism 30 has been installed onto the caster to ensure that the caster maintains constant contact with a traveling surface of varying topography.

The term "one piece mechanism" is used herein to refer to the extension from the frame attachment to the guide wheel attachment, but does not include any hardware that may be used to provide the frame attachment or the guide wheel attachment.

While the preferred embodiment of the invention has been described with respect to a shopping cart, it will be known to those of ordinary skill in the art that a wide variety of carts may be adapted to the invention without departing from the scope of the invention.

What is claimed is:

1. A guide wheel assembly for retrofit to a conventional shopping cart consisting of:
   a fixed wheel capable of rotation only along a horizontal axis;
   a flexible one piece mechanism having a material memory to enable said mechanism to return to an original position after being deflected from said original position by a traveling surface of varying topography;
   said one piece mechanism having two ends, one end being connected to said fixed wheel, an opposite end connected to said shopping cart to provide a single connection of said guide wheel assembly to said shopping cart; and
   a means of connecting said one piece mechanism to one end of said shopping cart at a single position, such that said single connection of said guide wheel assembly is at said single position, wherein said one piece mechanism is formed of spring steel to enable said wheel to maintain constant contact with a traveling surface.

2. The guide wheel assembly of claim 1 wherein said one piece mechanism is connected to said shopping cart in a configuration to enable the nesting of a plurality of said shopping cards having duplicate said guide wheel assemblies.

3. The guide wheel assembly of claim 1 wherein said fixed wheel is attached to said one piece mechanism in a manner that does not impede said fixed wheel traveling over a curb.

* * * * *